United States Patent [19]

Tanasawa et al.

[11] 4,365,746
[45] Dec. 28, 1982

[54] SWIRL INJECTION VALVE

[75] Inventors: Yasusi Tanasawa, Nagoya; Norio Muto, Aichi; Akinori Saito; Kiyomi Kawamura, both of Nagoya, all of Japan

[73] Assignee: Kabushiki Kaisha Toyota Chuo Kenkyusho, Aichi, Japan

[21] Appl. No.: 158,460

[22] Filed: Jun. 11, 1980

[30] Foreign Application Priority Data

Jun. 20, 1979 [JP] Japan .................................. 54-77665
Jun. 20, 1979 [JP] Japan ............................. 54-84303[U]

[51] Int. Cl.³ .......................................... F02M 61/06
[52] U.S. Cl. .................................. 239/125; 239/488; 239/533.12; 239/585
[58] Field of Search ................ 239/124, 125, 486–489, 239/533.2–533.12, 585

[56] References Cited

U.S. PATENT DOCUMENTS

| | | | |
|---|---|---|---|
| 1,952,816 | 3/1934 | Mock | 239/488 |
| 2,407,915 | 9/1946 | Ball | 239/464 |
| 3,241,768 | 3/1966 | Croft | 239/124 |
| 3,958,757 | 5/1976 | Happel et al. | 239/125 |
| 4,060,199 | 11/1977 | Brüne et al. | 239/488 |

FOREIGN PATENT DOCUMENTS 423367  7/1947  Italy .................................. 239/488

*Primary Examiner*—Andres Kashnikow
*Attorney, Agent, or Firm*—Oblon, Fisher, Spivak, McClelland & Maier

[57] ABSTRACT

A swirl injection valve includes: a nozzle body including a hollow cylindrical body having a hole and a bottom portion on which a nozzle port and a valve seat are formed; a needle valve member, slidably inserted and reciprocally moved within the hole of the nozzle body, having a tip portion for seating on the valve seat and controlling the opening and closing of the nozzle port; a swirl chamber formed upstream of the nozzle port and defined between an inner wall of the nozzle body and an outer wall of the needle valve member; a fuel supply passage formed within the nozzle body and connected to a fuel supply source; and inclined passage comprising at least one short passage connected to the swirl chamber and the fuel supply passage and tangentially opened to the swirl chamber at a predetermined inclined angle. The fuel is tangentially supplied from the inclined passage to the swirl chamber without pressure loss. Thus the intense swirling flow of the fuel is formed within the swirl chamber and injected from the nozzle port, thereby stably and efficiently injecting the fuel at a predetermined spray angle into extremely fine particle.

33 Claims, 23 Drawing Figures

FIG. 1 PRIOR ART
FIG. 2 PRIOR ART
FIG. 3 PRIOR ART
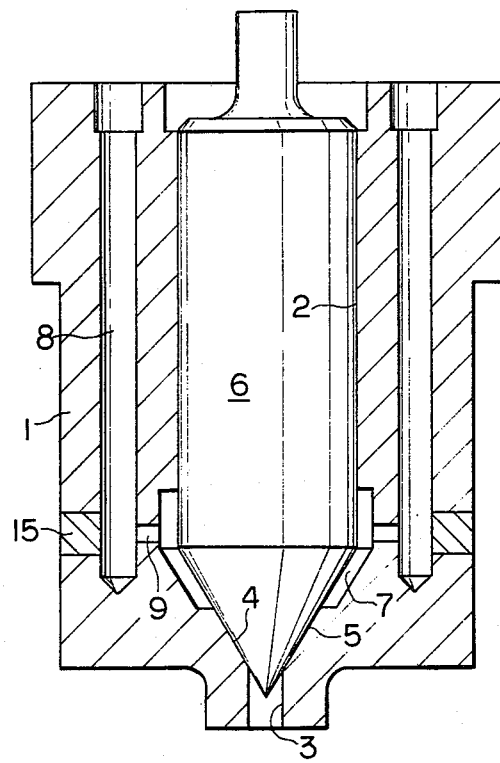
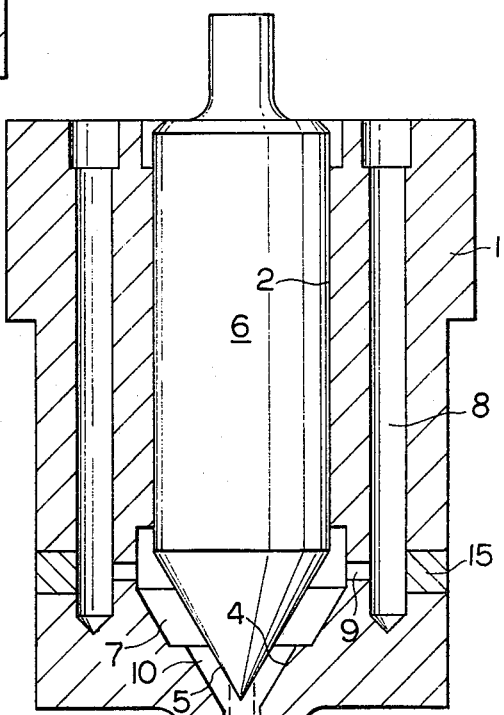
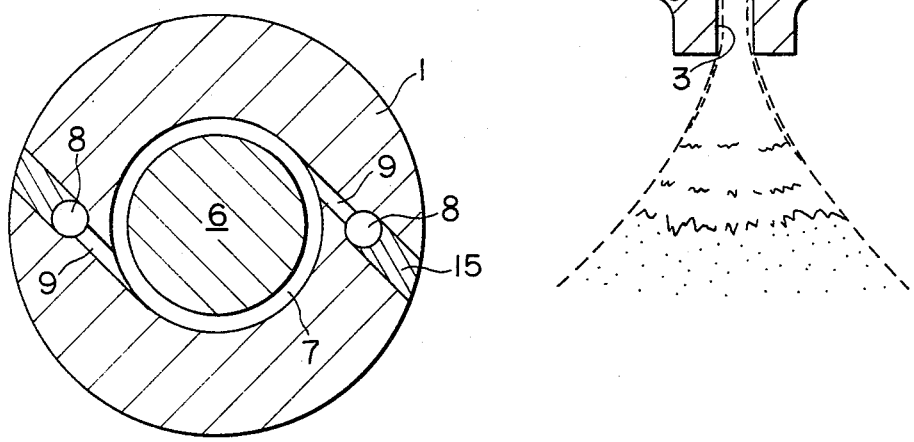

FIG. 4
PRIOR ART
FIG. 5
PRIOR ART
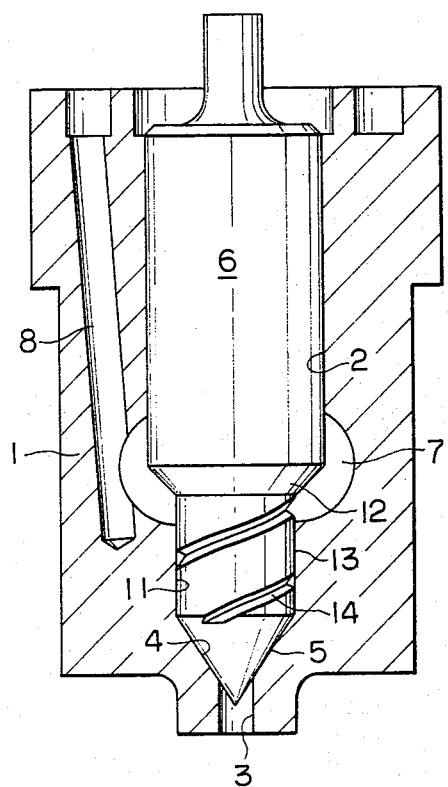
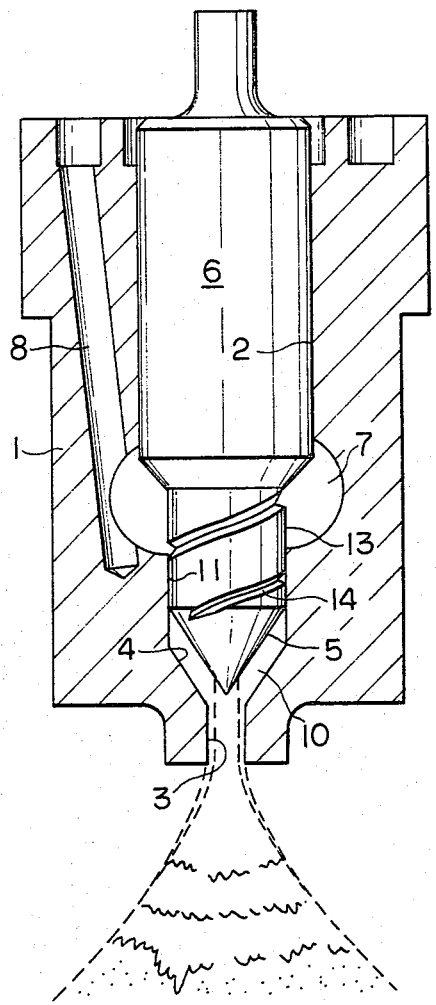

FIG. 9
FIG. 10
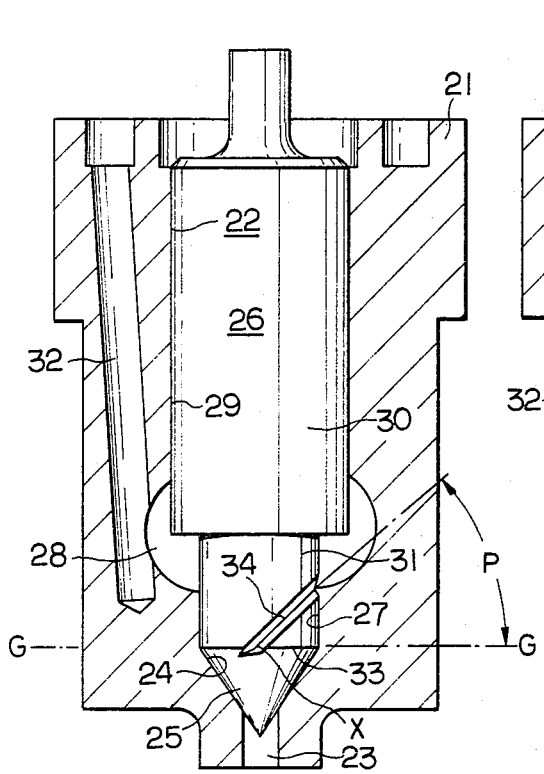
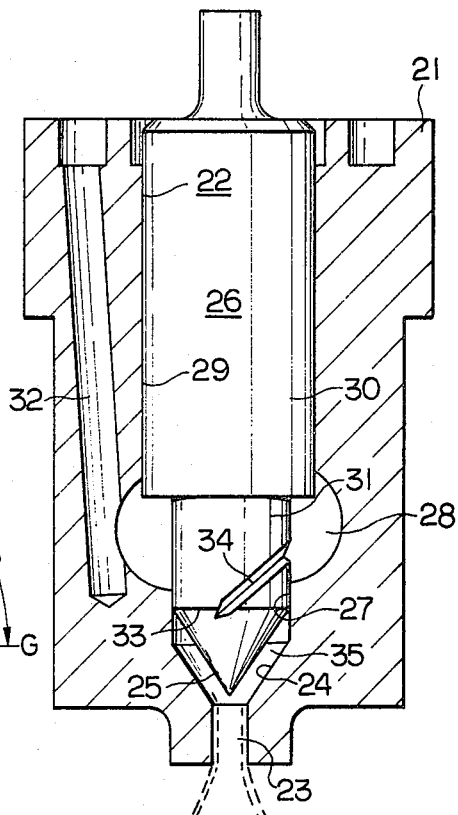
FIG. 11
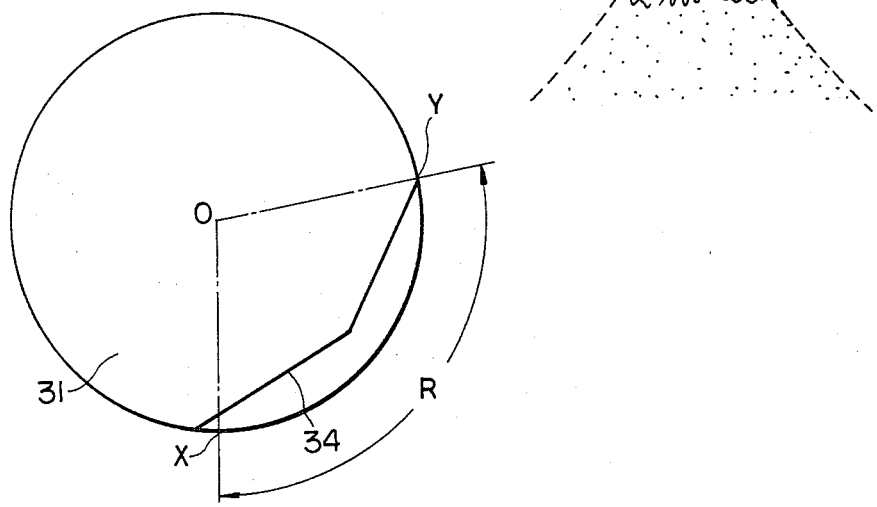

F I G. 15 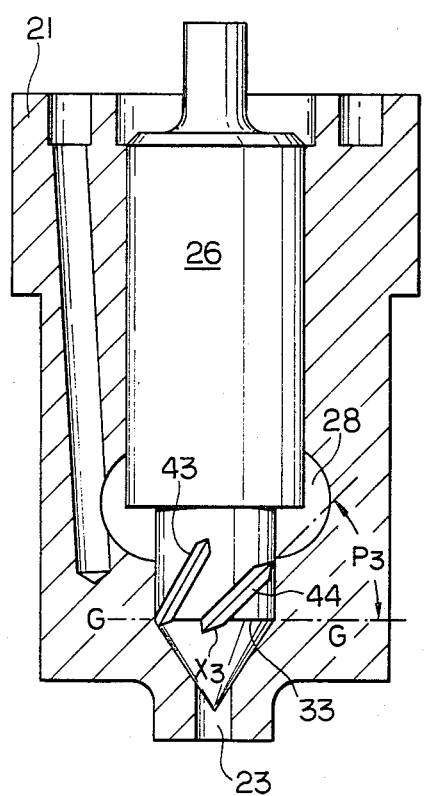
F I G. 16 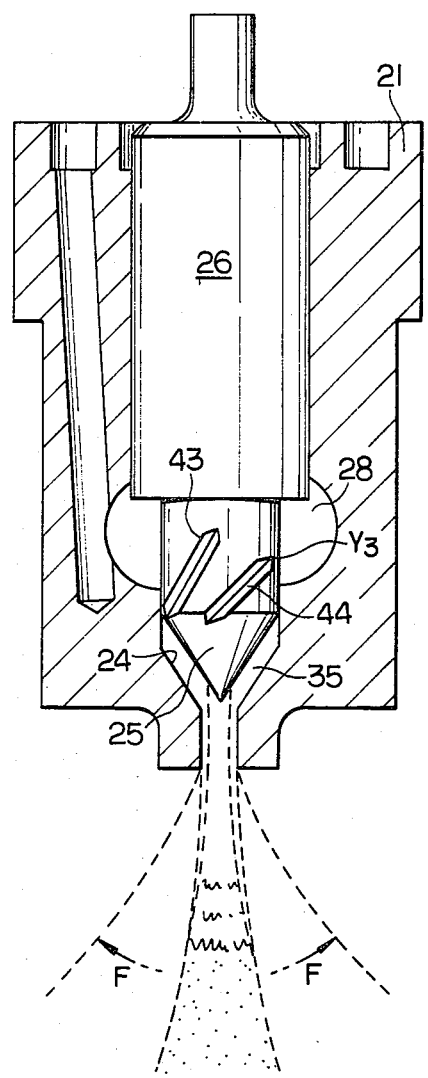

FIG. 17
FIG. 18
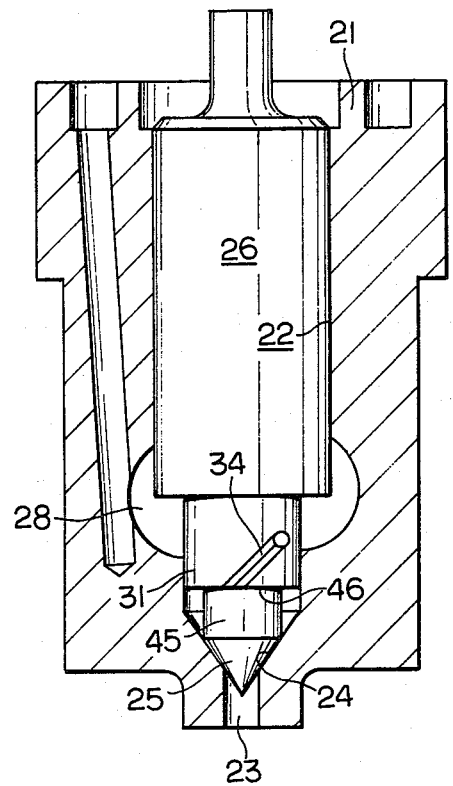
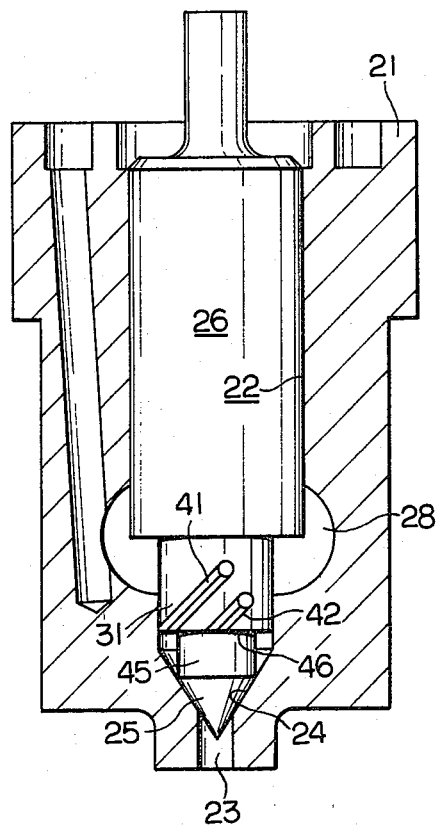

SWIRL INJECTION VALVE

BACKGROUND OF THE INVENTION

1. Field of the Invention

The present invention relates to a fuel injection valve for use in an internal combustion engine such as a Diesel engine, and more particularly to a swirl injection valve for injecting a liquid in the form of fine particles.

2. Description of the Prior Art

In the injection valve of this kind, generally speaking, a needle valve is made axially movable within a through hole formed in the body of the injection valve so that the nozzle port formed at the leading end of the through hole is shut off by the needle valve, thereby to inject a liquid under pressure from the nozzle port when the needle valve is moved in the valve opening direction. This injection valve is divided into a first type, in which the needle valve has its leading end formed into a conical valve member to be seated on a frusto-conical valve seat formed at the upstream side of the nozzle port, or a second type, in which the nozzle port is formed at the center of a diaphragm formed at the leading end portion of the body of the injection valve so that the valve member formed at the leading end of the needle valve is forced into a seated position upon the diaphragm. According to these injection valves, however, it is quite difficult to improve the liquid atomizing characteristics and to prevent the liquid from dropping when the valve is closed, merely by changing the shape of the needle valve.

In an improved type of the prior art, the atomizing characteristics, e.g., the distributions of droplets size, diameter, surface area, weight and volume, and the mean droplet diameter relative to those distributions are well known to be good if a swirl liquid flow is established during the liquid injection around the center axis of the needle valve so that the liquid may be injected under a high pressure from the nozzle port. With reference to FIGS. 1 to 5, there is shown a swirl injection valve according to the known concept, in which a swirl chamber is formed within the body of the injection valve upstream of the seating portion between the needle valve and its valve seat.

FIGS. 1 to 3 show a swirl injection valve for intermittently injecting a fuel. In this injection valve, a nozzle port 3 is formed at the leading end portion of the through hole 2 which is formed in the body 1 of the injection valve, and a frusto-conical valve seat 4 is formed at the upstream side of the nozzle port 3. A needle valve 6, which is formed with a conical surface 5 to be seated on the valve seat 4, is axially slidably fitted in the through hole 2. Thus, when the conical surface 5 of the needle valve 6 is seated upon the valve seat 4, the injection of the liquid is interrupted (as shown in FIG. 1.) On the other hand, when the needle valve 6 is moved in the opening direction, the liquid is injected from the nozzle port 3. In the nozzle body 1, moreover, the through hole 2 is expanded upstream of the valve seat 4 to form a pressure chamber 7 between the body 1 and the needle valve 6 being seated upon the valve seat 4. A communication passage 9 for supplying a liquid from a liquid passage 8 into the pressure chamber 7 is opened into the pressure chamber 7 tangentially of the circumference thereof (as shown in FIG. 2). When the injection valve thus constructed has its needle valve 6 moved in its opening direction, the liquid is fed from the liquid passage 8 through the communication passage 9 to the pressure chamber 7 in the tangential direction to the chamber circumference so that it flows down while accomplishing the swirling (or spiral) motions within the pressure chamber 7 and the swirl chamber 10, which is formed between the valve seat 4, downstream of the pressure chamber 7, and the needle valve 6, until it is injected from the nozzle port 3 (as shown in FIG. 3).

In an intermittent type swirl injection valve shown in FIGS. 4 and 5, on the other hand, that portion of the through hole which is downstream of the pressure chamber 7 connected to the liquid passage 8 and upstream of the frustoconical valve seat 4, is formed into a cylindrical surface 11. The needle valve 6 is formed with a cylindrical surface 13 which is formed between the conical surface 5 at the leading end thereof and a conical surface 12 at the upstream side so that it is hermetically fitted in the cylindrical surface 11. There is formed in the surface of the needle valve 6 thus constructed a spiral groove 14 which is started from the upstream side conical surface 12 to pass through the cylindrical surface 13 and over the boundary between the surface 13 and the conical surface 5 at the leading end until it reaches a position upstream of the seated portion of the surface 5 upon the valve seat 4. According to the swirl injection valve thus constructed, while the needle valve 6 is being seated upon the valve seat 4, the downstream end of the spiral groove 14 is shut off by the seating operation of the conical surface 5 thereby to interrupt the injection of the liquid. On the contrary, when the needle valve is moved in its opening direction, the liquid from the pressure chamber 7 flows down along the spiral groove 14 through the clearance between the needle valve 6 and the inner wall of the through hole 2 so that it is injected from the nozzle port 3 (as shown in FIG. 5) while swirling (spirally) within the swirl chamber 10 which is formed between the valve seat 4 and the leading conical surface 5 of the needle valve 6.

In the swirl injection valve having the construction shown in FIGS. 1 to 3, the formation of the communication passage 9 tangentially of the circumference of the pressure chamber 7 is accomplished by forming a bore from the outside of the nozzle body 1 through the liquid passage 8 and by hermetically forcing a plug 15 into the bore at the outer portion of the body 1. In the case of the injection valve having such construction, the communication passage 9 is so relatively short that the pressure loss can be held at a low level. If there exist fine powder dusts in the liquid to be injected, especially, the fuel for a Diesel engine, they are liable to be deposited at a region from the trailing end of the liquid passage 8 to the communication passage 9. In case the deposition of the powder dusts proceeds, it becomes necessary to extract the plug 15 and to clear the deposited dusts, but the extraction of the plug 15 is not easy.

In the swirl injection valve having the construction shown in FIGS. 4 and 5, on the other hand, the cleaning operation of the spiral groove 14 can be accomplished without difficulty by extracting the needle valve 6 itself. In the injection valve of this type according to the prior art, however, the spiral groove 14 has both ends formed, respectively, in the leading end conical surface 5 constituting the seat surface of the needle valve 6 and the upstream side conical surface 12 and has its major portion formed in the cylindrical surface 13 having a reduced diameter at the leading end portion of the needle valve 6. As a result, since the effective area of the spiral groove 14 is small and since the spiral groove itself is formed more than 360 degrees about the center axis of the needle valve 6 according to the designing requirement, the pressure loss when a liquid flows at a high speed through the spiral groove is much higher than that for the construction shown in FIGS. 1 to 3.

On the other hand, there is a spill type swirl injection valve, in which a liquid is fed from its supply source through a supply passage to a swirl chamber thereby to establish a swirl flow around the valve member of the needle valve, while partly spilling the liquid through a spill passage to the supply source, thereby to establish the swirl flow in the swirl chamber at all times. Thus, the liquid forming the swirl flow is injected from a nozzle port when the needle valve is moved in its opening direction to bring its valve member apart from the valve seat. The conventional injection valve of this type has the disadvantages that the machining of the fuel supply passage in the restricted portion at the leading end of the nozzle body in a manner to establish a sufficient swirl flow in the swirl chamber is extremely difficult. Also, the assembling and cleaning operations are difficult. Further, the fuel flow rate and the fuel spray angle cannot be freely selected with ease.

SUMMARY OF THE INVENTION

FIG. 6 is a diagrammatical view showing the injection valve, which is equipped with the needle valve formed with a spiral groove, according to the experiments conducted by the inventors. FIG. 6 shows a swirl chamber formed when the needle valve having the spiral groove on its circumference is opened, the angle (or the angle of inclination of the groove) between the center line of the groove, at the boundary between the conical surface forming the valve surface and the cylindrical surface of the needle valve, and the plane which is normal to the center axis of the needle valve is denoted at P, and the spray angle of the liquid to be sprayed from the nozzle port of the injection valve is denoted at Q. If the inclination angle P is increased, the spray angle Q has a tendency to be decreased (as seen from FIG. 7). On the other hand, if the ratio of the inlet area of the swirl chamber, i.e., the sectional area of the spiral groove, to the exit area of the swirl chamber, i.e., the sectional area of the nozzle port of the injection valve, is increased, the spray angle has a tendency to be decreased (as seen from FIG. 8). Moreover, those tendencies have been found to depend upon the inclination angle and the minimum of the sectional area of the spiral groove at the inlet of the swirl chamber, i.e, the downstream end of the spiral groove (or the groove portion intersecting the boundary between the conical surface and the cylindrical surface of the needle valve) so that they are hardly changed no matter how the inclination of the upstream portion of the spiral groove is changed.

On the basis of the afore-mentioned findings, the inventors have advanced the studies with a view to minimizing the pressure loss in the liquid to be injected by a swirl injection valve and to simplifying the manufacture as much as possible. The inventors found that the formation of the swirling flow in the swirl chamber and the pressure loss are highly dependent upon the sectional area and angle of the slight length portion of the downstream end portion of the spiral groove or the communication passage, which is tangentially opened into the swirl chamber. From these findings, the inventors have conceived the present invention.

It is, accordingly, an object of the present invention to provide an improved swirl injection valve in which the pressure loss of the fuel flowing at a high velocity is remarkably reduced, thus attaining a stable and efficient injection of the fuel.

Another object of the present invention is to provide an improved swirl injection valve which forms an intense swirling flow of the fuel, thereby enabling the injection of the fuel in the form of a conical thin film to atomize the fuel into extremely fine particles.

A further object of the present invention is to provide an improved swirl injection valve which attains excellent atomizing characteristics from the initial stage of the injection immediately after the valve opening operation, thus preventing the fuel from being injected in large sizes.

A still further object of the present invention is to provide an improved swirl injection valve which has a simplified construction, thus facilitating the machining operation, while enjoying the high precision, as well as the assembling and cleaning operations.

A still further object of the present invention is to provide an improved swirl injection valve which allows free selection of the fuel flow rate and the fuel spray angle with ease.

A still further object of the present invention is to provide an improved swirl injection valve which allows injection of a small quantity of the fuel at a large spray angle at the initial stage of the injection for facilitating the ignition of a Diesel engine, and then injection of a desired quantity of the fuel at a small spray angle after the middle stage of the injection.

A still further object of the present invention is to provide an improved swirl injection valve which allows injection of a small quantity of the fuel at a small spray angle at the initial stage of the injection and then injection of a desired quantity of the fuel at a large spray angle after the middle stage of the injection, thus providing the injection system for a Diesel engine in which the ignition is effected at a preset portion in a combustion chamber to propagate the combustion therefrom.

The swirl injection valve according to the present invention includes: a nozzle body including a hollow cylindrical body having a hole and a bottom portion on which a nozzle port and a valve seat are formed; a needle valve, slidably inserted and reciprocally moved within the hole of the nozzle body, having a tip portion for seating on the valve seat and controlling the opening and closing of the nozzle port; a swirl chamber formed upstream of the nozzle port and defined between an inner wall of the nozzle body and an outer wall of the needle valve member; a fuel supply passage formed within the nozzle body and connected to a fuel supply source; and inclined passage including at least one short passage connected to the swirl chamber and the fuel supply passage and tangentially opened to the swirl chamber at a predetermined inclined angle, the short passage provided on a cylindrical surface having an axially constant radius; whereby, when the needle valve member is moved from its seated position in its opening direction, the fuel is tangentially supplied to the swirl chamber from the inclined passage and the swirling flow of the fuel is formed within the swirl chamber, so that the swirling flow of the fuel is injected from the nozzle port.

Since the swirl injection valve having the construction thus for described according to the present invention has the inclined passage shortened, the pressure loss of the fuel under a high pressure which flows at a high velocity through the inclined passage is remarkably reduced so that the fuel can flow at a high velocity without having its pressure deteriorated. Further, the fuel is given a swirling force through the inclination of the passage, thereby to establish an intense swirling flow in the swirl chamber. As a result, the fuel is instantly injected in the form of a conical thin film from the nozzle port to be divided into remarkably fine droplets so that the atomizing characteristics of the injection valve can be highly improved from those of the conventional injection valve. More specifically, the injection valve of the present invention is excellent in the distributions of droplet size, diameter, surface area, weight and volume, and the mean droplet diameter relative to those distributions.

Moreover, the swirl injection valve according to the present invention can have the highly practical advantages, thanks to the reduction in the length of the inclined passage, in that the machining operation for forming the inclined passage is facilitated while enjoying high precision and in that not only the assembling operation but also the cleaning operation after use can also be accomplished with ease.

On the other hand, according to the swirl injection valve of the present invention, the length of the inclined passage is such that it is only extended within the range of 0 (noninclusive) to 180 degrees, preferably 60 to 100 degrees, in terms of the center angle about the center axis of the needle valve.

Now, the present invention will be described with respect to two aspects thereof.

According to the first aspect of the invention, there is provided an intermittent type swirl injection valve in which the injection of fuel through the nozzle port is interrupted when the needle valve member is at its seated position, allowing the fuel to reside within the fuel supply passage, and when the needle valve member is moved from its seated position in its opening direction, the fuel is instantly fed from the fuel supply passage through a short inclined passage into the swirl chamber defined between the nozzle body and the needle valve member, as a swirling flow, thereby injecting the fuel through the nozzle port.

In the swirl injection valve of this type, the swirl chamber is formed when the needle valve member is moved from its seated position in its opening direction, and the inclined passage has its upstream end connected to the fuel supply passage and has its downstream end positioned upstream of the needle valve surface to be seated.

According to the first aspect thus constructed, since the inclined passage is so shortened that remarkably a little fuel resides therein during the valve closing operation, the atomizing characteristics are so excellent from the initial stage of the valve opening operation that the fuel can be prevented from being injected in large sizes or dropping down, which is contrary to the prior art. Since, moreover, the inclined passage is completely shut off by the seating action of the needle valve member, there can be attained the practical effect that the proper sealing effects can be obtained while ensuring the satisfactory operating conditions.

According to the second aspect of the present invention, there is provided an intermittent, spill type swirl injection valve, in which, when the swirl injection valve has its needle valve member seated, the injection of the fuel from the nozzle port is interrupted but the fuel is fed from the fuel supply passage through the inclined passage into the swirl chamber always formed between the nozzle body and the needle valve member, thereby to establish the swirling flow, while the fuel is partly spilled through the fuel spill passage in the nozzle body to the fuel supply source, thereby to establish the intense swirling flow in the swirl chamber at all times, and in which, when the needle valve member is shifted from the seated position in its opening direction, the fuel swirling in the swirl chamber is instantly injected from the nozzle port.

According to the second aspect thus constructed, since the swirling force is imparted to the fuel by the inclined passage so that the swirling flow in the swirl chamber is intense and since the intense swirling flow is always established and held in the vicinity of the nozzle port, while the needle valve member is closed, so that the swirling fuel is injected from the nozzle port simultaneously with the valve opening operation, the remarkably excellent atomizing characteristics can be realized immediately after the initiation of the injection to the termination of the injection, thus resulting in the practically excellent effects.

Here, the first and second aspects thus far described can be constructed by forming the inclined passage as follows.

Firstly, the inclined passage is a groove which is formed at an inclination on the outer circumference of the needle valve member separating the fuel supply passage and the swirl chamber.

The inclined passage having this construction has the practical effect that its machining operation is facilitated while its cleaning operation is simplified because it is formed in the needle valve member.

Secondly, the inclined passage is a groove or passage which is formed at an inclination in the wall portion of the nozzle body (or of the cylindrical member fixed to the nozzle body) axially slidably receiving the needle valve member.

Since the inclined passage having this construction is short although formed in the wall portion of the nozzle body, it can be easily machined and cleaned conveniently.

Further, according to the first and second aspects of the present invention, two or more of the inclined passages may be formed, if desired.

More specifically, by the formation of two or more short inclined passages, there can be attained the practical effect that, since the pressure loss of the fuel flowing through the passages can be remarkably reduced thereby to ensure the high velocity flow and since the intense swirling force is applied to the fuel by the inclinations of the plural inclined passages, the more intense and uniform swirling flow can be established in the swirl chamber so that the atomizing characteristics can be accordingly improved.

Since, moreover, the plural inclined passages may be located at axially different positions for communicating with the fuel supply portion of the fuel supply passage in accordance with the movement of the needle valve member so that the swirling flows of the fuel are spurted from the respective inclined passages into the swirl chamber, the injections can be accomplished at different fuel flow rates and at different spray angles.

By changing the respective inclination angles of the plural inclined passages, the flow rate of the fuel to be injected and the changing timing of the spray angle can be advantageously changed.

BRIEF DESCRIPTION OF THE DRAWINGS

Various other objects, features and advantages of the present invention will be apparent from the following detailed description when considered in connection with the accompanying drawings, in which like reference characters designate like or corresponding parts throughout the several views, and wherein:

FIGS. 1 to 5 show the intermittent type swirl injection valves according to the prior art;

FIGS. 9 to 11 show a first embodiment of the present invention;

FIGS. 15 to 16 show a third embodiment of the present invention;

FIGS. 17 and 18 show a fourth embodiment of the present invention;

DESCRIPTION OF THE PREFERRED EMBODIMENTS

Figure 6:
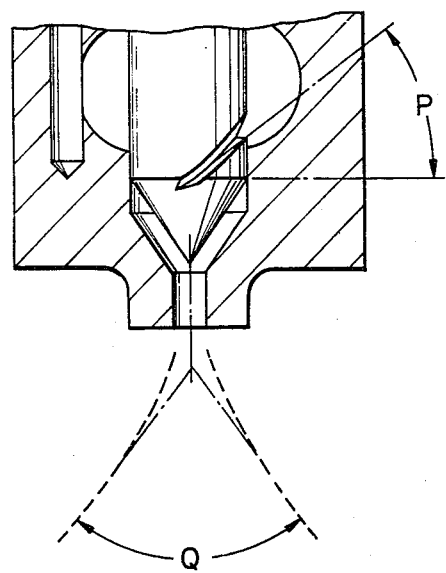
FIGS. 6 to 8 are diagrammatical views showing the experimental results obtained by the use of the injection valve having a needle valve formed with a spiral groove.
Figure 7:
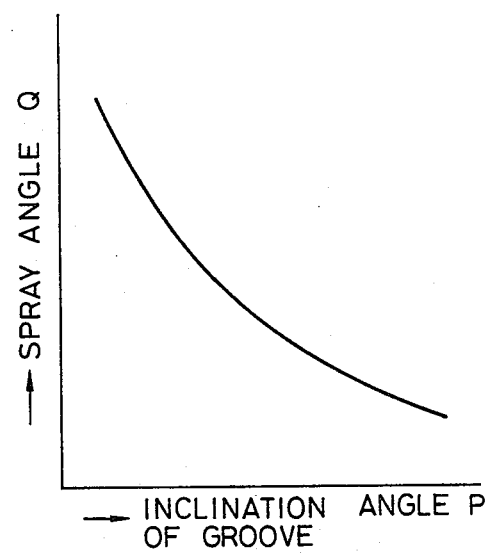

The present invention will now be described in connection with the embodiments thereof.

FIGS. 9 to 11 show an intermittent type swirl injection valve according to the first embodiment. In this embodiment, a through hole or bore 22 formed in the body 21 is formed at its leading end with a nozzle port 23. A conical valve seat 24 is formed upstream of the nozzle port 23. A needle valve 26, which is formed at its leading end with a conical surface 25 including the valve surface to be seated on the valve seat 24, is axially slidably fitted in the through hole 22.

The nozzle port 23 and conical valve seat 24 are coaxially formed. In the through hole 22, there are coaxially arranged a cylindrical surface 27 having a smaller diameter formed upstream of the valve seat 24, a pressure chamber 28 and a cylindrical surface 29 having a larger diameter. The large diameter portion 30 of the needle valve 26 is hermetically guided in the larger diameter cylindrical surface 29. On the other hand, the small diameter portion 31 which is formed upstream of the conical surface 25 at the leading end of the needle valve 26, is hermetically fitted in the small diameter cylindrical surface 27. Numeral 32 indicates a liquid passage, through which a liquid to be injected is supplied from the (not-shown) liquid supply source into the pressure chamber 28.

The needle valve 26 is formed on its outer wall with a groove 34 (5 mm in length) of a straight shape having a preset sectional area such that it intersects the boundary 33 between the conical surface 25 and the upstream circumferential surface contiguous thereto, i.e., the circumference of the small diameter portion 31, as shown. At the point X where the center line of the groove 34 intersects the boundary 33 on the circumference of the needle valve 26, the angle P between the center line of the groove 34 and plane G-G normal to the center axis of the needle valve is set at 30 to 60 degrees.

The groove 34 is formed to have the angle P at the point X by means of a suitable tool such as a thin blade grinder, a file or a cutter. The length of the groove 34 is so selected that, when the groove 34 is projected upon the surface normal to the center axis O of the needle valve 26, the center angle R from the point X to the upstream side terminal point P of the groove 34, i.e., the angle XOY jointing the points X and Y extending through a center axis is set within the range of 60 to 100 degrees. If the groove formed at the point X falls short of the desired angle R, the groove may be extended at the terminal end thereof by suitable means so that the groove is extended in the form of a bent graph, as best shown in FIG. 11. Moreover, after the groove portion having a desired sectional area and inclination angle at the point X is formed, the extension of the groove toward the pressure chamber 28 may be formed in any manner and method so long at it has not a smaller area than that of the aforementioned sectional area. The extending portion may be formed into a linear or curved shape or may have its leading end diverged into a sector shape so long at its leading end portion reaches the pressure chamber 28 when the needle valve 26 is seated. The important features of the first embodiment reside: in that the groove 34 having a desired sectional area and inclination angle is formed to extend across the boundary 33 between the conical surface 25, which is formed at the leading end of the needle valve 26, and the circumferential surface 31 upstream of and contiguous to the conical surface 25; in that the inclination angle P at the point X, where the groove intersects the boundary 33, is 30 to 60 degrees; and in that the center angle R, which corresponds to the circumferential length of the needle valve between the point X and the upstream side leading end point Y, when the groove is projected upon the plane normal to the center axis of the needle valve, is within the range from 60 to 100 degrees.

In the intermittent type swirl injection valve thus constructed according to the first embodiment, when the needle valve 26 is moved in its opening direction, a swirl chamber 35 (5 mm in diameter) is established between the valve seat 24 and smaller diameter cylindrical surface 27 of the through hole 22 and the conical surface 25 of the needle valve 26 so that the liquid fed under pressure from the pressure chamber 28 through the groove 34 into the swirl chamber 35 flows at the inclination angle P into the swirl chamber 35 as a swirling flow so that it is injected from the nozzle port 23 (as shown in FIG. 10). In this instance, the total length of the groove 34 is determined to have a center angle R of 30 to 60 degrees, when projected upon the plane normal to the center axis of the needle valve, and is remarkably smaller than that of the conventional injection valve, even if the inclination angle P is taken into consideration, so that the pressure loss of the liquid flowing under a high pressure and at a high velocity through the groove can be remakably reduced. Moreover, the angle of the liquid, when it flows into the swirl chamber 35, is determined at the portion intersecting the boundary between the conical surface 25 and the upstream circumferential portion of the needle valve 26. As a result, the desired remarkably stable and efficient atomization can be attained.

Figure 12:
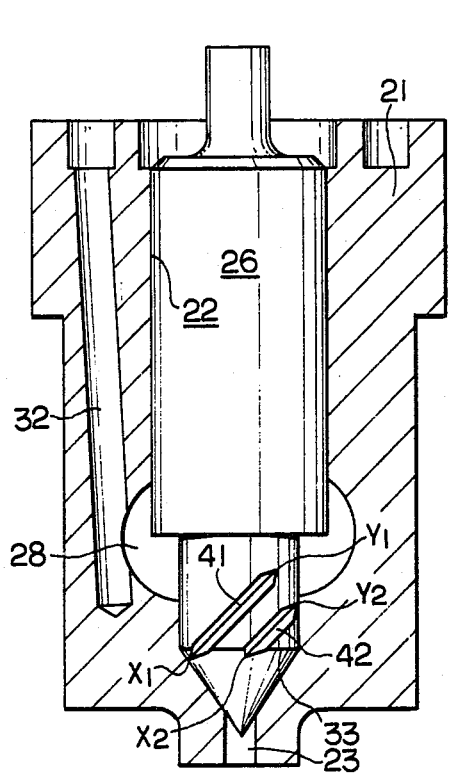
FIGS. 12 to 14 show a second embodiment of the present invention.
Figure 13:
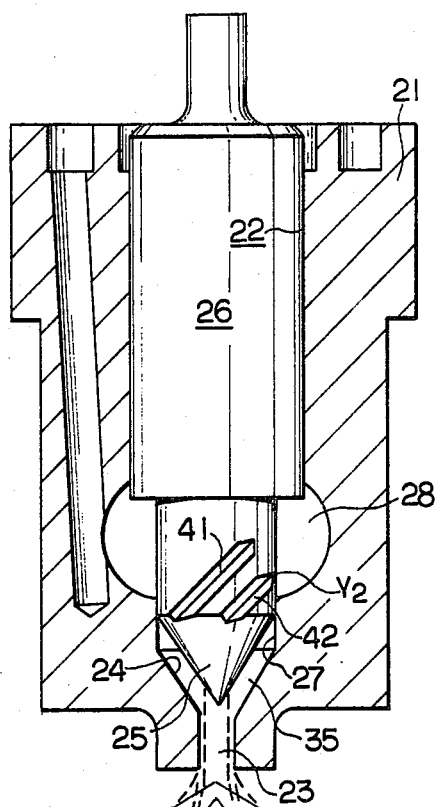
Figure 14:
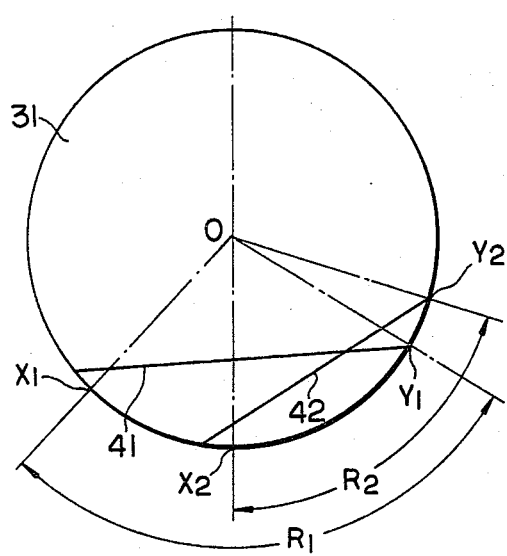

Next, FIGS. 12 to 14 show a second embodiment of the present invention, in which a shorter straight groove is formed in the injection valve shown in FIGS.

9 to 11, i.e., in the needle valve in addition to the aforementioned groove so that the injection angle may be varied during the operation of the injection valve.

More specifically, the construction of the nozzle body 21 and the through hole 22 are the same as those shown in FIGS. 9 to 11. The second embodiment is made different from the first one shown in FIGS. 9 to 11 only in that first and second straight grooves 41 and 42 are formed in the needle valve 26, which is composed of the large diameter portion 30, the small diameter portion 31 and the conical surface 25, such that they intersect the boundary 33 between the conical surface 25 and the upstream circumference, i.e., the small diameter portion 31.

The first groove 41 is so similarly constructed to the groove shown in FIGS. 9 to 11 that at the point $X_1$ where the center line of the groove 41 intersects the boundary 33 on the circumference of the needle valve 26, the groove 41 has the inclination angle P from 30 to 60 degrees between its center line and the plane G-G normal to the center axis of the needle valve. The length of the groove 41 is also similarly determined to that of the injection valve having been described with reference to FIGS. 9 to 11 such that the center angle $R_1$ from the point $X_1$ to the upstream side terminal point $Y_1$, i.e., the angle $X_1OY_1$, when the groove 41 is projected upon the plane normal to the center axis O of the needle valve 26, is within the range from 60 to 100 degrees. That is to say, the first groove 41 thus constructed has absolutely the same characters as those of the groove 34 shown in FIGS. 9 to 11.

The second groove 42 is formed at a spacing from the first groove 41 such that, at its point $X_2$ intersecting the boundary 33, it has substantially the same angle P defined between its center line and the afore-mentioned plane G—G as that of the first groove 41. The second groove 42 has its upstrean terminal point $Y_2$ so positioned that it is not opened into the pressure chamber 28 when the needle valve 26 is at its seated position, but is opened thereinto when the needle valve 26 is moved a preset distance in the valve opening direction. As a result, the center angle $R_2$, which is established when the groove 42 is projected upon the plane G—G, is made smaller than the center angle $R_1$ of the first groove 41.

The downstream ends of those first and second grooves 41 and 42, where they intersect the boundary 33 at the points $X_1$ and $X_2$, are positioned upstream of the seated surface of the conical surface 25 of the leading end portion of the needle valve 26 upon the valve seat 24 so that the injection of the liquid is interrupted (as shown in FIG. 12) when the needle valve 26 is seated upon the valve seat 24. The grooves 41 and 42 thus formed may be linearly cut by means of a tool such as a thin blade grinder or cutter in a manner to establish the inclination angle P (as shown in FIG. 14). Those indicated at the same reference numerals as those of FIGS. 9 to 11 are the same parts or portions, respectively.

In the intermittent type swirl injection valve thus constructed according to the second embodiment, when the needle valve 26 is moved in its opening direction, a liquid is introduced at the inclination angle P first through the first groove 41 into the swirl chamber 35, which is formed between the valve seat 24 and small circumferential surface 27 of the through hole 22 and the conical surface 25 of the needle valve 26, and is injected at an injection angle $Q_1$ from the nozzle port 23.

Figure 8:
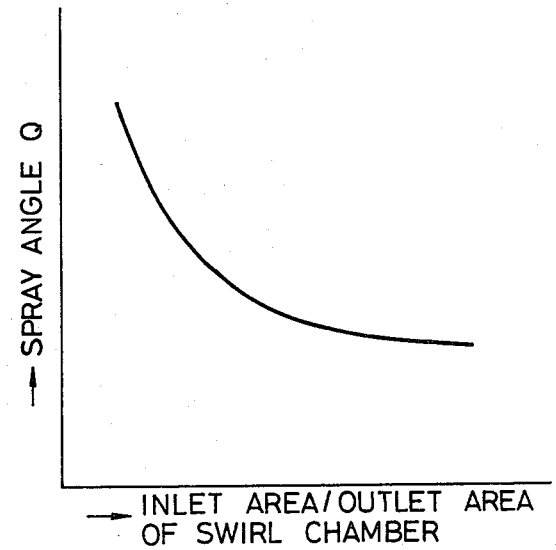

At this time, no liquid flows into the second groove 42. When the needle valve 26 is further moved a preset distance in the valve opening direction, the upstream terminal $Y_2$ of the second groove 42 is opened into the pressure chamber 28. As a result, the liquid from the pressure chamber 28 flows at the inclination angle P into the swirl chamber 35 through the second groove 42 thereby to increase the effective inlet area of the swirl chamber 35 so that the spray angle $Q_2$ of the liquid from the nozzle port 23 is decreased (as shown in FIG. 8). As shown at arrows E and E in FIG. 13, a small quantity of the liquid is injected at a large spray angle at the initial stage of the injection. After the middle stage of the injection, on the contrary, a desired quantity of the liquid is injected at a smaller spray angle than that at the initial stage. According to the injection system thus far described, therefore, there can be easily accomplished the so-called "pilot injection", in which the small quantity of spray is effected at the initial stage of the fuel injection for facilitating the ignition of a Diesel engine.

In the injection valve thus far described, moreover, the spray angle at the initial stage of the injection is determined by the sectional area of the first groove 41, whereas the spray angle after the middle stage of the injection is determined by the area which is the summation of the sectional areas of the first and second grooves 41 and 42. On the other hand, the changing timing of the injection angle is determined by the timing, at which the upstream terminal point $Y_2$ of the second groove 42 is opened into the pressure chamber 28. As a result, in case a preset quantity of liquid is to be injected by a single injection, the spray angles at the initial stage and after the middle of the injection and their changing timings can be changed by changing the differences in the center angles $R_1$ and $R_2$ as well as in the effective areas of the first and second grooves 41 and 42 in a correlated manner. More specifically, it is preferable that the center angle $R_2$ of the second groove 42 be smaller 20 to 80 degrees than the center angle $R_1$ of the first groove 41.

FIGS. 15 and 16 show a third embodiment of the present invention, in which a second groove having a smaller length than the first groove is made to have a smaller inclination angle than that of the first groove so that the spray angle is small at the initial stage effecting the injection by the first groove but is increased after the middle stage of the injection with the second groove being opened into the pressure chamber.

More specifically, the third embodiment shown in FIGS. 15 and 16 is made similar to the afore-mentioned embodiment shown in FIGS. 12 to 14 in that the angle P between the center line of a first groove 43 and the plane G—G, which is normal to the center axis of the needle valve, at a point where the center line intersects the boundary 33 between the conical surface 25 and the upstream small diameter portion 31 of the needle valve 26 on the circumference of the needle valve 26, is preset at 30 to 60 degrees; and in that the center angle corresponding to the circumferential length from the point of the groove 43 intersecting the boundary 33 to the upstream terminal point of the groove 43 when the groove 43 is projected upon the plane G—G is preset at 60 to 100 degrees. For a second groove 44, however, the inclination angle $P_3$ between the center line of the groove 44 and the plane G—G at a point $X_3$ where the groove 44 intersects the boundary 33 is made smaller than that of the groove 43, and the upstream terminal point $Y_3$ of the groove 44 is so positioned as not to be opened into the pressure chamber 28 under the condition having the needle valve 26 seated but to be opened into the same when the needle valve is moved a preset distance in its opening direction. The remaining construction is made the same as that of the embodiment shown in FIGS. 12 to 14.

In the intermittent type swirl injection valve thus constructed according to the third embodiment, the spray of a liquid is interrupted when the needle valve 26 is seated (as shown in FIG. 15). On the contrary, when the needle valve 26 is moved in its opening direction, the spray at the initial stage of the injection is effected with the liquid spurting from the first groove 43 into the swirl chamber 35. When the needle valve 26 is further opened a preset distance, the second groove 44 is opened into the pressure chamber 28 so that the liquid under pressure flows into the swirl chamber 35 at a smaller inclination angle than that of the first groove 43. As a result, the spray angle from the nozzle port 23 is explained, as shown at arrows F and F of FIG. 16, from that of the initial stage of the injection. Therefore, the injecting system thus described is useful in the Diesel engine when it is intended to ignite a preset portion in the combustion chamber and to propagate the combustion therefrom. By enlarging the inclination angle of the first groove 43 and/or increasing the sectional area of the same, the spray angle of the fuel to be injected from the nozzle port 23 at the initial stage of the injection is reduced, thereby directing a small quantity of the fuel to a preset portion. Further, by reducing the inclination angle of the second groove 44 and/or reducing the sectional area of the same, a desired quantity of the fuel can be injected at an enlarged spray angle.

In order to attain the finally required liquid injection even in the third embodiment thus far described, by changing the inclination angles and the sectional areas of the first and second grooves relative to each other, the spray angles and the injections both at the initial stage and after the middle stage can be changed in various manners. By changing the distance from the upstream terminal point of the second groove to the pressure chamber in various manners when the needle valve is seated, moreover, it is quite natural that the injection timings of the second groove can be changed.

Turning now to FIGS. 17 and 18 showing an intermittent type swirl injection valve according to a fourth embodiment of the present invention, the needle valve is formed at its leading end portion with both a different diameter portion 45, which is located between the conical surface 25 to be seated upon the valve seat 24 and the small diameter portion 31 to be fitted in the through hole 27 upstream of the conical surface 25, and a stepped boundary 46 between the different diameter portion 45 and the small diameter portion 31, and a groove having a straight shape and a desired sectional area is formed in a manner to intersect the stepped boundary 46. In FIG. 17, moreover, the groove 34 is formed in accordance with the first embodiment with the same resultant effects as those attained by the embodiment shown in FIGS. 9 to 11. In FIG. 18, on the other hand, the grooves 41 and 42 are formed in accordance with the second embodiment of the present invention with the same resultant effects as those attained by the embodiment shown in FIGS. 12 to 14. The same characters in the drawings show the same portions and parts.

In the fourth embodiment, in which the stepped boundary 46 is formed to position the groove or grooves, as shown in FIGS. 17 and 18, it is possible to prevent the portion to be seated upon the valve seat from being erroneously machined during the groove cutting operation thereby to deteriorate the sealing effects, thus improving the production precision.

Figure 19:
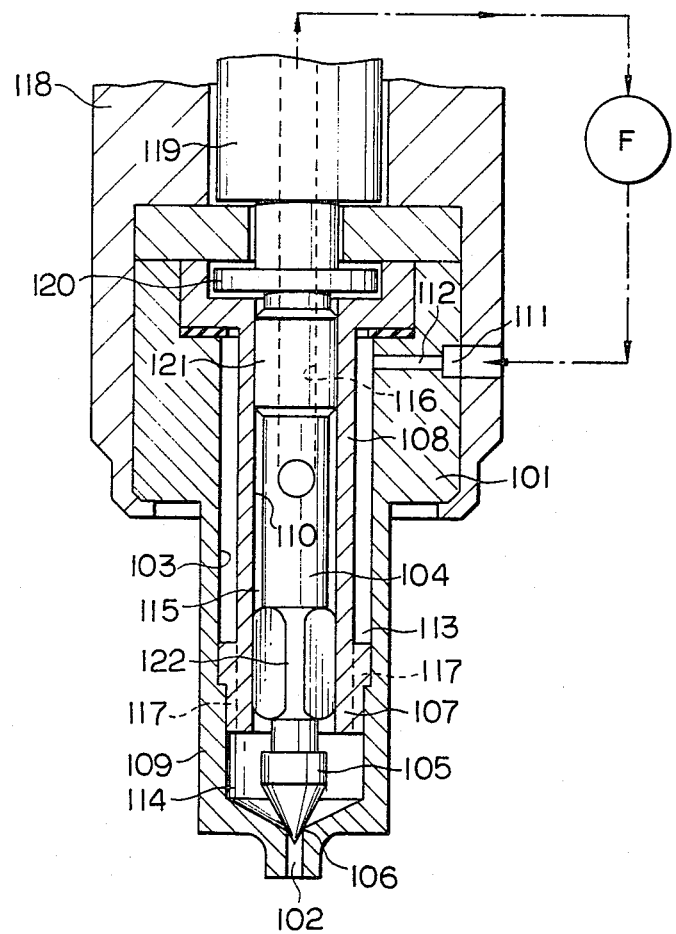
FIGS. 19 and 20 show a fifth embodiment, in which the present invention is applied to an intermittent, spill type swirl injection valve.
Figure 20:
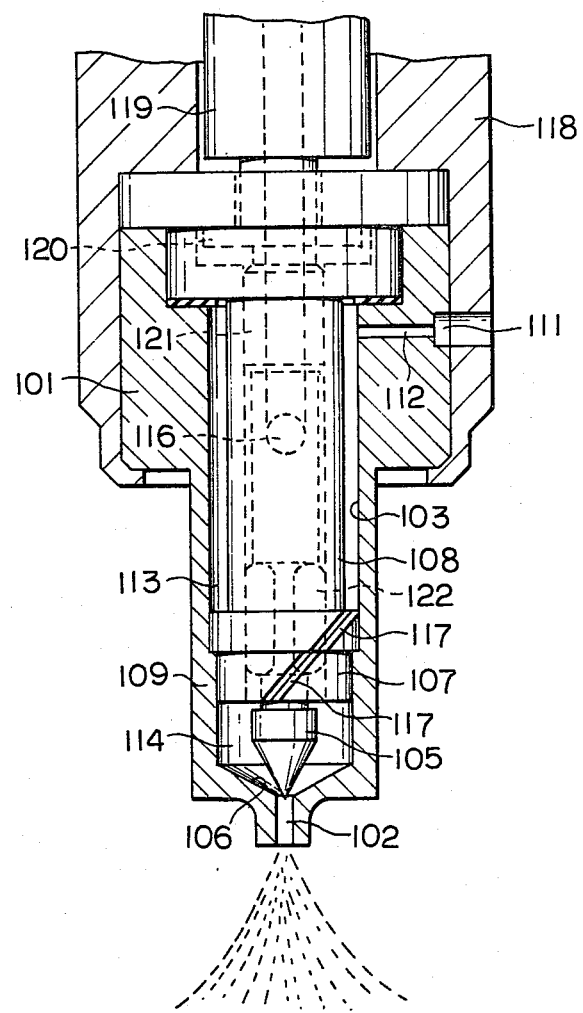

FIGS. 19 and 20 show a spill type swirl injection valve according to a fifth embodiment of the present invention. A nozzle body 101 is formed with a through hole 103 which in turn is formed at its leading end into a nozzle port 102. There is axially slidably fitted in the through hole 103 a needle valve 104 which has its leading end portion formed into a valve member 105 having a conical surface. This valve member 105 is seated at its conical surface upon a valve seat 106, which is formed upstream of the nozzle port 102, thereby to open or close the nozzle port 102. There is fitted in the through hole 103 of the nozzle body 101 a guide cylinder 108 composed of a main portion of a hollow cylinder and a bottom portion as a flange-shaped partition member 107 which expands coaxially and diametrically outwardly. The guide cylinder 108 is fixed at a position where the step portion of the partition member 107 is in abutment against a stepped portion 109 which is formed at a downstream portion of the through hole 103. The guide cylinder 108 has its inner wall 110 constituting the guide surface for the sliding movement of the needle valve 104. The partition member 107 is constructed to have its outer circumference hermetically fitted in the inner wall of the through hole 103. The upper surface of the partition member 107 and the outer wall of the guide cylinder 108 define an annular pressure chamber 113 for having communication with a liquid supply source F through a support port 111 and a liquid passage 112 for the liquid supply. Moreover, a swirl chamber 114, into which the valve member 105 of the needle valve 104 is made to protrude, is formed between the lower surface of the partition member 107 and the downstream end portion of the through hole 103. The chamber 114 constitutes the spill passage to the liquid supply source F through a liquid passage 115 between the inner wall 110 of the guide cylinder 108 and the needle valve 104 and through a liquid passage 116 which is formed in the valve 104. Thus, the partition member 107 separates the pressure chamber 113 and the swirl chamber 114. The partition member 107 has its outer circumferential surface formed with a straight groove 117 (as shown in FIG. 20), which is inclined at a preset angle of 30 to 60 degrees with respect to the plane normal to the center axis of the through hole 103 so that the pressure chamber 113 and the swirl chamber 114 are made to have communication by way of the groove 117. The groove 117 is extended 60 to 100 degrees in terms of the center angle about the center axis of the needle valve.

Here, the nozzle body 101 is fixed to the lower end of the main body 118 of the injection valve. The needle valve 104 has its upper end fixed to a plunger 119, which is electromagnetically actuated by the (not-shown) electromagnetic coil of a (not-shown) electromagnetic control device built in the injection valve main body 118, so that the sliding movement within a distance as is restricted by a stopper 120 is transmitted. Other reference numerals 121 and 122 indicate guide portions, which are formed on the needle valve 104 such that the guide portion 121 has its circumferential surface hermetically fitted in the inner wall 110 of the guide cylinder 108 whereas the guide portion 122 has its circumferential surface composed of curved portions contacting with the inner wall 110 and of flat portions for passing the liquid.

In the fifth embodiment thus far described, under the condition with the valve member 105 of the needle valve 104 being seated upon the valve seat 106, as shown in FIG. 19, the liquid fed under pressure from the liquid supply source F is introduced through the supply port 111 and the liquid passage 112 into the pressure chamber 113, from which the liquid under pressure is fed through the groove 117 so that a swirling flow is established within the swirl chamber 114. After that, the liquid under pressure is spilled through the liquid passages 115 and 116 into the reservoir of the liquid supply source F. By spilling the liquid in this way, the liquid under pressure in the swirl chamber 14 flows down as the swirling flow at the inclination angle of the groove 117 and along the circumferential wall of the swirl chamber 114 so that it swirls along the valve member 105 into the liquid passage 115. When the plunger 119 is pulled up by the operation of the electromagnetic control device so that the needle valve 104 is moved in its opening direction, the valve member 105 leaves apart from the valve seat 106, as shown in FIG. 20, to open the nozzle port 102 so that the swirling flow in the swirl chamber 114 is sprayed at a desired spray angle from the nozzle port.

Most of the conventional swirl injection valves are constructed such that the swirling flow is established in the swirl chamber only at the instant when the needle valve is moved in the opening direction. In the swirl injection valve of this prior art kind, the liquid is left under the stationary condition until the instant immediately before the movement of the needle valve so that the stationary liquid, as it is, is injected from the nozzle, resulting in a mass of the liquid. According to the fifth embodiment, on the contrary, since the liquid in the swirl chamber 114 is always swirling, there can be attained the excellent resultant effect that the liquid forms a conical thin film, even at the instant when the injection through the nozzle port 102 is started, so that it can be sprayed into fine particles.

The fifth embodiment can enjoy the additional effects that the atomizing characteristics are improved while minimizing the pressure loss and that the construction is simplified to facilitate the assembly while enhancing the accuracy.

Figure 21:
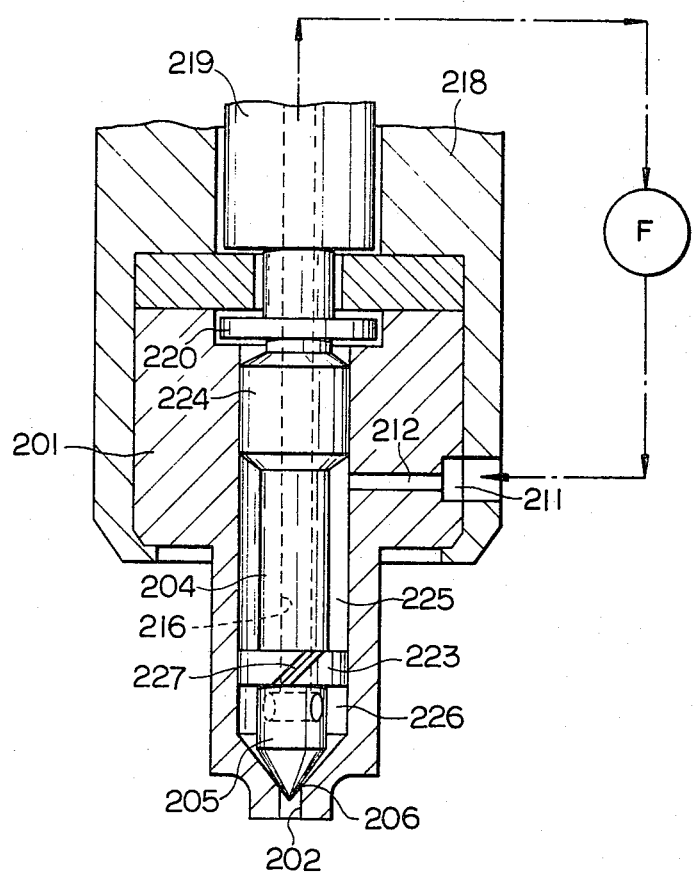
FIG. 21 shows a modification of the fifth embodiment.

Turning now to FIG. 21 showing a modification of the fifth embodiment of the present invention: a partition member 223 is directly provided on a needle valve 204 in a manner to expand in the diametrical direction thereof and has its outer circumferential wall directly and hermetically fitted in the inner wall of the through hole 203 of a nozzle body 201; an annular pressure chamber 225 is formed between the upper side of the partition member 223 and a guide portion 224 which is hermetically fitted in the through hole 203; a swirl chamber 226 (5 mm in diameter) is formed between the lower side of the partition member 223 and a valve seat 206. Thus, the inside of the through hole 203 is divided into the pressure chamber 225 and the swirl chamber 226. Moreover, the partition member 223 has its outer circumferential wall formed with a straight groove 227 (5 mm in length), which is inclined at a preset angle with respect to the center axis of the through hole 203 thereby to provide communication between the two chambers 225 and 226.

In the embodiment thus modified, the liquid under pressure fed from the liquid supply source is introduced from a supply port 211 and a liquid passage 212 into the annular pressure chamber 225, which is formed between the needle valve 204 and the inner wall of the through hole 203, so that it spurts as a swirling flow into the swirl chamber 226 from the groove 227, which is formed in the outer circumference of the partition member 223, downward along the wall of the swirl chamber 226 while being spilled into the reservoir of the supply source F through a liquid passage 216 which is formed in the needle valve 204. When the needle valve 204 is moved in the opening direction, the liquid, which has been held as the swirling flow in the swirl chamber 226, is injected out of a nozzle port 202.

In addition to substantially the same resultant effect to that of the afore-mentioned fifth embodiment, the modification thus far described can enjoy the effect that the construction is further simplified, while reducing the number of parts, thereby to make the production, assembly and disassembly simple and convenient. According to the present modification, therefore, even in case foreign matters such as dusts or the like in the liquid are deposited in the groove 227 after a long use, the injection valve can be disassembled and cleaned without difficulty.

Figure 22:
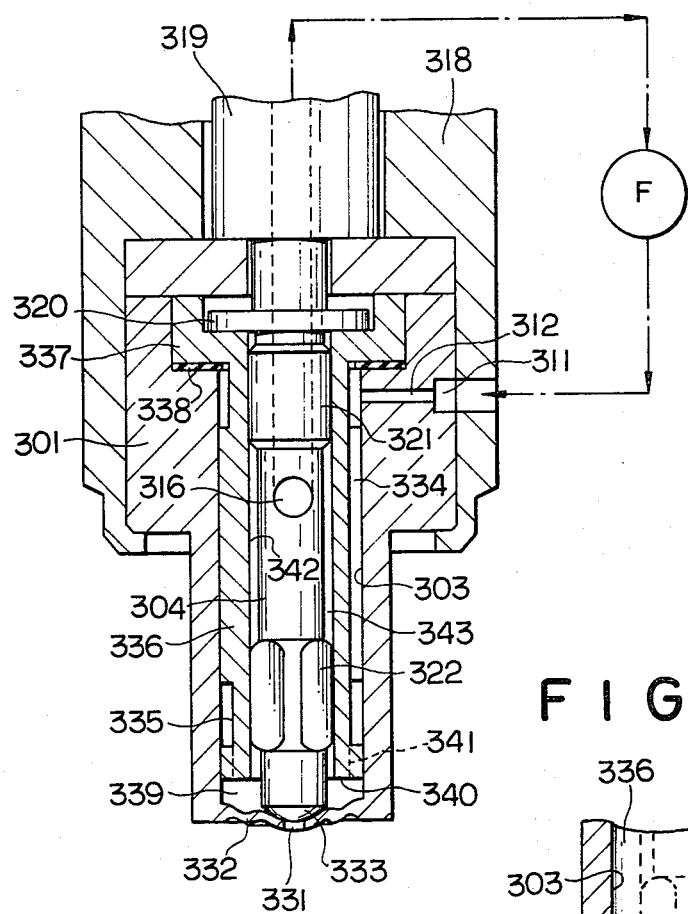
FIGS. 22 and 23 show a sixth embodiment of the present invention.
Figure 23:
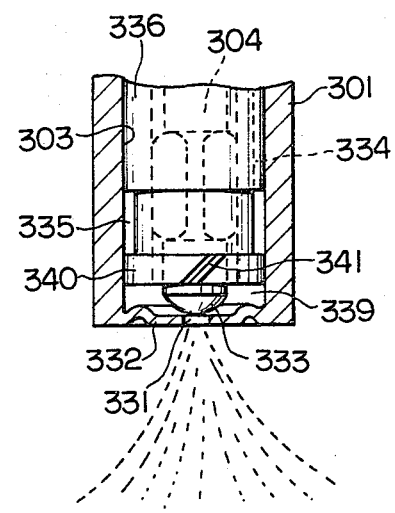

FIGS. 22 and 23 show a sixth embodiment of the present invention. In this sixth embodiment, a nozzle port 331 is formed at the center of a diaphragm 332 which is mounted on the leading end of a nozzle body 301 in a manner to shut off the through hole 303 thereof. At the leading end portion of a needle valve 304, on the other hand, there is disposed a rounded valve member 333 which is seated on the diaphragm 332 under a slightly warped condition, when a stopper 320 is at its lower stop end, thereby to shut off the nozzle port 331. There is fitted in the through hole 303 of the nozzle body 301 a guide cylinder 336 which is formed on its outer circumference with such recesses as constitute both a liquid passage 334 having communication with a liquid passage 312 formed in the nozzle body 301 and an annular pressure chamber 335 having communication with the liquid passage 334. The guide cylinder 336 thus fitted is fixedly positioned such that a shoulder portion 337 formed at the upper portion thereof is in abutment against the step portion 338 of the nozzle body 301. The guide cylinder 336 has its lower end portion formed into a partition member 340 which effects separation between the pressure chamber 335 and a swirl chamber 339 formed between the lower end of the guide cylinder 336 and the diaphragm 332. Moreover, the partition member 340 has its outer circumference hermetically fitted in the inner wall of the through hole 303 and formed with a straight groove 341 which is inclined at a preset angle of 30 to 60 degrees with respect to the center axis of the through hole 303 thereby to establish communication between the pressure chamber 335 and swirl chamber 339. The groove is extended within the range of 60 to 100 degrees in terms of the center angle about the center axis of the needle valve member. The needle valve 304 is axially slidably fitted in the inner wall 342 of the guide cylinder 336 by means of both a hermetical guide portion 321 and a guide portion 322 which is formed with flat portions for passing the liquid.

In the sixth embodiment thus constructed according to the present invention, the valve member 333 shuts off the nozzle port 331 when the stopper 320 is at its lower stop end position. Under this condition, the liquid under pressure fed from the liquid supply source F is introduced through the supply port 311 and the liquid passages 312 and 334 into the pressure chamber 335 so that it is further introduced from the pressure chamber 335 through the groove 341 into the swirl chamber 339 while establishing the swirling flow in the swirl chamber 339. The liquid is then spilled to the reservoir of the supply source F by way of the liquid passage 343, which is formed between the inner wall 342 of the guide cylinder 336 and the needle valve 304, and the liquid passage 316 which is formed in the needle valve 304. When the needle valve 304 is moved in the opening direction so that the stopper 320 reaches its upper stop end position, the valve member 333 leaves the diaphragm 332 thereby to open the nozzle port 331 so that the swirling flow from the swirl chamber 339 is sprayed from the nozzle port 331.

The sixth embodiment thus constructed can attain substantially the same resultant effects to those of the embodiment having been described with reference to FIGS. 19 and 20 and can inject the liquid at a low pressure with the remarkably excellent atomizing characterisics so that it can find its proper application as the electronic control type fuel injection valve for the Diesel engine.

In case, moreover, the sixth embodiment is applied to the direct injection type, a sealing pressure between the valve member 333 and the diaphragm 332 is added to the pressure in the fuel chamber so that the proper sealing pressure can be attained, even in case the pressure in the injection space is high, with the resultant practical effect that the satisfactory operating condition is ensured.

As has been described hereinbefore, the swirl injection valve according to the present invention has been conceived in a series of experiments conducted by use of the needle valve having the groove or grooves with a view to eliminate the drawback concomitant with the prior art swirl injection valve which has a high pressure loss and which is quite difficult to manufacture. More specifically, the experiments have revealed that the increase and decrease in the spray angle due to the changes in the angle of inclination of the groove and in the sectional area of the groove are dependent upon the inclination and sectional area of the short section of the groove at the inlet of the swirl chamber, i.e., at the downstream end of the groove. On the basis of these findings, the groove or grooves for establishing the swirling flow are formed. Since the length of the groove is sufficiently short, the pressure loss to be effected when a highly pressurized liquid flows at a high speed through the groove can be remarkably reduced, and the effects, by which the liquid is injected in the form of a conical thin film from the nozzle port so that it is sprayed into fine droplets, can be more excellent than those obtained in case the groove is long.

Moreover, since the groove is made short and since the injection angle is dependent upon the inclination angle at the groove outlet, the groove may be formed into a straight shape. Therefore, the groove can be precisely machined even by the use of a thin blade grinder. In case no precision is required, the groove can be easily formed with the use of a file or other cutters or the like. A burr, if any, can be removed without difficulty.

Since the groove length is small, according to the present invention, two kinds of grooves may be formed at the leading end of the needle valve so that the two-stage injection can be accomplished by the injection valve. In addition to the first groove, which has its downstream end positioned at the upstream side of the conical valve surface to be seated upon the valve seat and its upstream end positioned at the fluid supply portion when the needle valve is under its seated condition, more specifically, there is formed the second groove which intersects the boundary between the conical surface of the needle valve and the upstream circumference of the same and which has its downstream end positioned at the upstream side of the conical valve surface of the needle valve and its upstream end at a preset distance downstream of the fluid supply portion and shut off by the wall of the through hole when the needle valve is under its seated condition. As a result, when the needle valve is moved in its opening direction, the liquid is first sprayed by the first groove. When this movement proceeds to open the upstream end of the second groove into the fluid supply portion, the spraying operation is performed by the liquid swirling flow coming from the first and second grooves into the swirl chamber. As a result, the spraying operations with variable rate and angle can be accomplished at any timing during the spraying operations.

By changing the inclination angle of the second groove, moreover, the spray angle can be accordingly changed. In addition to this feature, the quantity of the spray and the timing of the spray angle change can also be changed by changing the position of the upstream side terminal end of the second groove.

The groove for establishing the swirling flow may be formed in the outer circumference of a large diameter cylindrical member, which is fitted in and fixed to the inner wall of the through hole of the nozzle body. Then, the machining operation of the groove can be simplified with high precision, and the assembling operation and the cleaning operation after use can be effected without any difficulty. Further, the second groove may be formed in the outer circumference of the cylindrical member at the axially symmetrical position with respect to the first groove. The second groove will be useful particularly when the foreign matters should be deposited in the first groove to make it inoperative after long use.

Moreover, the injection valve according to the present invention (the second aspect) may be exposed to a high temperature, e.g. in a case in which the fuel is directly sprayed into the combustion chamber of an internal combustion engine. Even in this case, since the injection valve is always cooled down by the fuel spilled within the valve, it can be completely free from the disadvantage, which is often experienced by the prior art injection valve, such as the seizure of the needle valve to the nozzle body or the abnormal injection due to the vapor lock in the fuel, so that the satisfactory spray can always be fed to the combustion chamber. Thus, by forming the spilling nozzle port in the side wall of the needle valve in a manner to face the swirl chamber, the intense swirling flow of the fuel may be continued within the swirl chamber, thereby attaining the practically excellent effect that the markedly satisfactory atomizing characteristics can be realized immediately after the beginning of the injection until the termination of the injection.

In the swirl injection valve according to the present invention, by selecting the sum of the sectional area of the groove or grooves at a proper ratio to the sectional area of the nozzle port, it is possible to freely select the angle of divergence or spray of the conical liquid film (or atomization) to be injected from the nozzle port.

According to the second aspect of the invention, by arranging an orifice for metering the spill at a portion of the spill passage positioned as close to the swirl chamber as possible, preferably, such that the orifice has a suitable size relative to the sectional area of the nozzle port, generally, the former being smaller than the latter, it is possible to effect the remarkably responsive and stable atomization simultaneously with the opening operation of the needle valve, although the rate of spill is small as compared with the rate of injection. With this construction, the rate of the liquid to be injected from the needle valve is so directly proportional to the time period for which the needle valve is open that the control of injection can be accomplished remarkably accurately and easily.

By providing a variable orifice downstream of the spill passage for metering the spill rate, in addition to the aforementioned metering orifice, such that its effective area can be electrically controlled, it is also possible to increase and decrease the injection rate with the injection pulse width being left unchanged. In the case of use in the fuel injection valve for an internal combustion engine, the increase in the fuel supply for starting or acceleration can be advantageously controlled.

Thus, by accomplishing the spill, the spray angle is stabilized, and the atomization can be accomplished remarkably stably even under a low injection pressure. By suitably selecting the size of the spill passage, the rate of injection can be made stable and accurate. As a result, the spray angle can correspond to the ratio in size between the spill passage and the nozzle port so that the design of the nozzle can be made remarkably easy.

The feature that the satisfactory atomization can be attained at the instant of the beginning of the injection is considerably advantageous for a highly short injection pulse (or the injection period), e.g., that shorter than 2 mili-seconds.

The swirl injection valve according to the present invention can have its shape and construction and their combination so highly simplified that the production, machining and assembly can be more facilitated for mass-production than the various injection valves according to the prior art, that the durability and reliability can be made remarkably excellent without any trouble while facilitating the handling and so that the production cost can be reduced.

As described above, according to the findings from the series of experiments conducted by the inventors, the swirling flow to be generated in the swirl chamber is determined by the inclination angle at the exit portion of the groove or passage, which is formed in the outer circumference of the needle valve or the partition member, and the mere elongation of the groove or passage would be useless in minimizing the pressure loss. In the present invention, for example, the surface of the partition member to be fitted in the through hole in the axial direction of the latter is set about 1/5 to 1.5 times the diameter of the partition member (for example, about 2 to 10 mm). Therefore, the straight groove may be formed by means of a cutter or the like. Thus, it is possible to easily provide a swirl injection valve which has remarkably low pressure loss.

According to the present invention, the center line of the groove at the exit thereof, i.e., at the point where the groove center intersects the boundary between the conical and cylindrical surfaces of the needle valve or where it intersects the lower side end of the partition member, is inclined at an angle within the range of 10 to 90 (noninclusive) degrees, preferably 30 to 60 degrees, with respect to the plane normal to the axis of the needle valve or the through hole. Further, the groove, when it is projected on a plane normal to the center axis of the needle valve or the through hole, is extended only within the range of 0 (noninclusive) to 180 degrees, preferably 60 to 100 degrees, in terms of the center angle about the center axis of the needle valve or the through hole.

According to the present invention, the groove may be of a straight shape, a spiral shape or the like, so long as its whole length is within the range described above. Moreover, the section of the groove need not be limited to the shape of a letter "V" but can be made to have a groove of suitable section.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A swirl injection valve comprising:
    a nozzle body comprising a hollow cylindrical body having a bore and a bottom portion on which a nozzle port and a valve seat are formed;
    a needle valve member, slidably inserted and reciprocally moved within said bore of said nozzle body, having a cylindrical surface of axially constant radius and a tip portion for seating on said valve seat and controlling opening and closing of said nozzle port;
    a swirl chamber formed upstream of said nozzle port and defined between an inner wall of said nozzle body and an outer wall of said needle valve member;
    a fuel supply passage formed within said nozzle body and connected to a fuel supply source; and
    inclined passage means wherein said inclined passage means further comprises at least one short passage connected to said swirl chamber and said fuel supply passage and tangentially opened to said swirl chamber at a predetermined inclined angle, said at least one short passage being provided substantially exclusively on said cylindrical surface of axially constant radius and being extended, when projected on a plane normal to the center axis of said needle valve member, within the range of 0 to 180 degrees with respect to the center angle about the center axis of said needle valve member, such that when said needle valve member is moved from a seated position of said valve in an opening direction fuel from said fuel supply passage is tangentially supplied to said swirl chamber from said inclined passage means and a swirling flow of the fuel is formed within said swirl chamber, so that the swirling flow of the fuel is injected from said nozzle port.

2. A swirl injection valve according to claim 1, wherein said inclined passage means, when projected on a plane normal to the center axis of said needle valve member, is extended within the range of 0, noninclusive, to 100 degrees in terms of the center angle about the center axis of said needle valve member.

3. A swirl injection valve according to claim 2, wherein said inclined passage means has an inclination angle within the range of 10 to 90 (noninclusive) degrees, said inclination angle being formed by the center line of said inclined passage means and a plane normal to the center axis of said needle valve member.

4. A swirl injection valve according to claim 3, wherein said inclined passage means has said inclination angle within the range of 30 to 60 degrees.

5. A swirl injection valve according to claim 2, wherein said inclined passage means is extended within the range of 60 to 100 degrees in terms of the center angle about the center axis of said needle valve member.

6. A swirl injection valve according to claim 1, wherein said swirl chamber is formed only when said needle valve member is at an opening position of said needle valve member.

7. A swirl injection valve according to claim 6, wherein said inclined passage means is provided in the outer wall of said needle valve member.

8. A swirl injection valve according to claim 1, wherein said swirl chamber is formed at all times irrespective of the position of said needle valve member.

9. A swirl injection valve according to claim 8, wherein said inclined passage means is provided in the outer wall of said needle valve member.

10. A swirl injection valve according to claim 9, further comprising fuel spill passage means connected to said swirl chamber and to said fuel supply source, such that part of the fuel is spilled from said swirl chamber to said fuel supply source.

11. A swirl injection valve according to claim 10, wherein
said bore of said nozzle body has an upstream stepped portion,
said needle valve member further comprises an upper end connected to an electromagnetically actuated plunger, a stopper means for restricting sliding movement thereof within a predetermined distance, an upstream and a downstream guide portion hermetically fitted in the inner wall of said nozzle body, said downstream guide portion forming a partition member, and said tip portion of a conical shape,
the outer wall of said needle valve member and the inner wall of said nozzle body define an annular pressure chamber between an upper surface of said partition member and a lower surface of said upstream guide portion of said needle valve member, said annular pressure chamber being connected to said fuel supply passage,
said swirl chamber is formed between a lower surface of said partition member and the inner wall of said nozzle body, said swirl chamber and said pressure chamber being separated by said partition member,
said inclined passage means further comprises a straight groove formed in an outer wall of said partition member and connected to said annular pressure chamber, for introducing the fuel from said annular pressure chamber to said swirl chamber, said groove having a preset sectional area at the downstream end thereof and having an inclination angle within the range of 30 to 60 degrees with respect to a plane normal to the center axis of said needle valve member and said groove being extended within the range of 60 to 100 degrees in terms of the center angle about the center axis of said needle valve member, and
said fuel spill passage means further comprises a spill passage formed within said needle valve member,
such that the fuel is injected in the form of a conical shape at a preset spray angle into extremely fine particles even immediately after a valve opening operation.

12. A swirl injection valve according to claim 1, wherein said inclined passage means is provided in the outer wall of said needle valve member.

13. A swirl injection valve according to claim 1, wherein said inclined passage means is provided in the inner wall of said nozzle body.

14. A swirl injection valve according to claim 1, wherein said inclined passage means is of a straight shape at a point where said inclined passage means opens into said swirl chamber.

15. A swirl injection valve according to claim 1, wherein said inclined passage means further comprises a plurality of short passages.

16. A swirl injection valve according to claim 15, wherein said plurality of short passages have the same inclination angle which is formed by the center line thereof and a plane normal to the center axis of said needle valve member.

17. A swirl injection valve according to claim 15, wherein said plurality of short passages have different inclination angles which are formed by the center lines thereof and a plane normal to the center axis of said needle valve member.

18. A swirl injection valve according to claim 15, wherein upstream ends of said plurality of short passages are located at the axially same position on said needle valve member.

19. A swirl injection valve according to claim 15, wherein upstream ends of said plurality of short passages are located at axially different positions on said needle valve member.

20. A swirl injection valve according to claim 15, wherein said plurality of short passages have the same sectional area.

21. A swirl injection valve according to claim 15, wherein said plurality of short passages have different sectional areas.

22. A swirl injection valve according to claim 1, wherein said inclined passage means is of a straight shape.

23. A swirl injection valve according to claim 1, wherein said inclined passage means is of a spiral shape.

24. A swirl injection valve comprising:
a nozzle body comprising a hollow cylindrical body having a bore and a bottom portion on which a nozzle port and a valve seat are formed;
a needle valve member, slidably inserted and reciprocally moved within said bore of said nozzle body, having a tip portion for seating on said valve seat and controlling the opening and closing of said nozzle port;
a swirl chamber formed upstream of said nozzle port and defined between an inner wall of said nozzle body and an outer wall of said needle valve member;
a fuel supply passage formed within said nozzle body and connected to a fuel supply source;
inclined passage means provided in the inner wall of said nozzle body wherein said inclined passage means further comprises at least one short passage connected to said swirl chamber and said fuel supply passage and tangentially opened to said swirl chamber at a predetermined inclined angle such that when said needle valve member is moved from its seated position in its opening direction, the fuel is tangentially supplied to said swirl chamber from said inclined passage means and a swirling flow of the fuel is formed within said swirl chamber, so that the swirling flow of the fuel is injected from said nozzle port; and a cylindrical member integrally fixed to said nozzle body and interposed between the inner wall of said nozzle body and the outer wall of said needle valve member, wherein said inclined passage means is provided in the outer wall of said cylindrical member.

25. A swirl injection valve comprising:

a nozzle body comprising a hollow cylindrical body having a bore and a bottom portion on which a nozzle port and a valve seat are formed;

a needle valve member, slidably inserted and reciprocally moved within said bore of said nozzle body, having a tip portion for seating on said valve seat and controlling the opening and closing of said nozzle port;

a swirl chamber formed at all times irrespective of the position of said needle valve member, upstream of said nozzle port and defined between an inner wall of said nozzle body and an outer wall of said needle valve member;

a fuel supply passage formed within said nozzle body and connected to a fuel supply source;

inclined passage means wherein said inclined passage means further comprises at least one short passage connected to said swirl chamber and said fuel supply passage and tangentially opened to said swirl chamber at a predetermined inclined angle such that when said needle valve member is moved from its seated position in its opening direction, the fuel is tangentially supplied to said swirl chamber from said inclined passage means and a swirling flow of the fuel is formed within said swirl chamber, so that the swirling flow of the fuel is injected from said nozzle port; and a cylindrical member integrally fixed to said nozzle body and interposed between the inner wall of said nozzle body and the outer wall of said needle valve member, wherein said inclined passage means is provided in an outer wall of said cylindrical member.

26. A swirl injection valve comprising:

a nozzle body comprising a hollow cylindrical body having a bore and a bottom portion on which a nozzle port and a valve seat are formed;

a needle valve member, slidably inserted and reciprocally moved within said bore of said nozzle body, having a tip portion for seating on said valve seat and controlling the opening and closing of said nozzle port;

a swirl chamber formed at all times irrespective of the position of said needle valve member and disposed upstream of said nozzle port and defined between an inner wall of said nozzle body and an outer wall of said needle valve member;

a fuel supply passage formed within said nozzle body and connected to a fuel supply source;

inclined passage means wherein said inclined passage means further comprises at least one short passage connected to said swirl chamber and said fuel supply passage and tangentially opened to said swirl chamber at a predetermined inclined angle such that when said needle valve member is moved from its seated position in its opening direction, the fuel is tangentially supplied to said swirl chamber from said inclined passage means and a swirling flow of the fuel is formed within said swirl chamber, so that the swirling flow of the fuel is injected from said nozzle port;

a cylindrical member integrally fixed to said nozzle body and interposed between the inner wall of said nozzle body and the outer wall of said needle valve member, wherein said inclined passage means is provided in an outer wall of said cylindrical member; and a fuel spill passage means connected to said swirl chamber and to said fuel supply source, such that part of the fuel is spilled from said swirl chamber to said fuel supply source.

27. A swirl injection valve according to claim 26, wherein said bore of said nozzle body has an upstream and a downstream stepped portion, said cylindrical member which is interposed between said nozzle body and said needle valve member further comprises an upstream stepped portion fixed to said upstream portion of said nozzle body, a main cylindrical portion, and a bottom portion forming a partition member hermetically fitted in the inner wall of said nozzle body, said partition member having an upper surface and a lower surface and a flange-shaped portion to abut against said downstream stepped portion of said nozzle body, the upper surface of said partition member, the outer wall of said main cylindrical portion and the inner wall of said nozzle body define an annular pressure chamber connected to said fuel supply passage, said needle valve member further comprises an upper end connected to an electromagnetically actuated plunger, a stopper means for restricting sliding movement thereof within a predetermined distance, an upstream guide portion hermetically fitted in the inner wall of said cylindrical member, a downstream guide portion having curved surfaces for contacting with the inner wall of said cylindrical member and flat surfaces for passing the fuel, and said tip portion of a conical shape, said swirl chamber is formed between the lower surface of said partition member and the inner wall of said nozzle body, said swirl chamber and said annular pressure chamber being separated by said partition member, said inclined passage means further comprises a straight groove formed in the outer wall of said partition member and connected to said annular pressure chamber, for introducing the fuel from said annular pressure chamber to said swirl chamber, said groove having a preset sectional area at the downstream end thereof and having an inclination angle within the range of 30 to 60 degrees with respect to a plane normal to the center axis of said needle valve member and said groove being extended within the range of 60 to 100 degrees in terms of the center angle about the center axis of said needle valve member, and said fuel spill passage means further comprises a first spill passage formed by the inner wall of said cylindrical member and the outer wall of said needle valve member, and a second spill passage formed within said needle valve member, such that the fuel is injected in the form of a conical shape at a preset spray angle into extremely fine particles even immediately after a valve opening operation.

28. A swirl injection valve according to claim 26, wherein said bore of said nozzle body has an upstream stepped portion and said bottom portion of said nozzle body further comprises a diaphragm as said valve seat and said nozzle port at the center of said diaphragm, said cylindrical member is hermetically fitted between said nozzle body and said needle valve member and further comprises an upstream stepped portion fixed to said upstream stepped portion of said nozzle body, a first recess constituting a fuel passage connected to said fuel supply passage, a second recess constituting an annular pressure chamber connected to said first recess, and a lower end portion forming a partition member, said needle valve member further comprises an upper end connected to an electromagnetically actuated plunger, a stopper means for restricting the sliding movement thereof within a predetermined distance, an upstream guide portion hermetically fitted in the inner wall of said cylindrical member, a downstream guide portion having curved surfaces for contacting with the inner wall of said cylindrical member and flat surfaces for passing the fuel, and said tip portion forming a rounded valve member to be seated on said diaphragm of said nozzle body, said swirl chamber is formed between a lower surface of said partition member and the inner wall of said nozzle body, said swirl chamber and said annular pressure chamber being separated by said partition member, said inclined passage means further comprises a straight groove formed in an outer wall of said partition member and connected to said annular pressure chamber, for introducing the fuel from said annular pressure chamber to said swirl chamber, said groove having a preset sectional area at the downstream end thereof and having an inclination angle within the range of 30 to 60 degrees with respect to a plane normal to the center axis of said needle valve member and said groove being extended within the range of 60 to 100 degrees in terms of the center angle about the center axis of said needle valve member, and said fuel spill passage means further comprises a spill passage formed within said needle valve member, such that the fuel is injected in the form of a conical shape at a preset spray angle into extremely fine particles even immediately after a valve opening operation.

29. A swirl injection valve comprising:

a nozzle body comprising a hollow cylindrical body having a bore and a bottom portion on which a nozzle port and a valve seat are formed;

a needle valve member, slidably inserted and reciprocally moved within said bore of said nozzle body, having a tip portion for seating on said valve seat and controlling the opening and closing of said nozzle port;

a swirl chamber formed upstream of said nozzle port and defined between an inner wall of said nozzle body and an outer wall of said needle valve member;

a fuel supply passage formed within said nozzle body and connected to a fuel supply source;

inclined passage means wherein said inclined passage means further comprises at least one short passage connected to said swirl chamber and said fuel supply passage and tangentially opened to said swirl chamber at a predetermined inclined angle such that when said needle valve member is moved from its seated position in its opening direction, the fuel is tangentially supplied to said swirl chamber from said inclined passage means and a swirling flow of the fuel is formed within said swirl chamber, so that the swirling flow of the fuel is injected from said nozzle port, wherein said inclined passage means, when projected on a plane normal to the center axis of said needle valve member, is extended within the range of 60 noninclusive, to 100 degrees in terms of the center angle about the center axis of said needle valve member, wherein said inclined passage means has an inclination angle within the range of 30 to 60 degrees, noninclusive, said inclination angle being formed by the center line of said inclined passage means and a plane normal to the center axis of said needle valve member and wherein said bore of said nozzle body further comprises a smaller diameter cylindrical portion formed upstream of said valve seat, a pressure chamber connected to said fuel supply source through said fuel supply passage, and a larger diameter cylindrical portion, and said needle valve member further comprises said tip portion of a conical shape, a smaller diameter portion formed upstream of said tip portion and hermetically fitted in said smaller diameter cylindrical portion of said nozzle body, and a larger diameter portion hermetically fitted in said larger diameter cylindrical portion of said nozzle body, said inclined passage means further comprises at least a first straight groove formed in an outer wall of said smaller diameter portion of said needle valve member, an upstream end of said groove being connected to said pressure chamber and a downstream end of said groove being positioned across a boundary between said tip portion and said smaller diameter portion of said needle valve member, such that said groove has a preset sectional area, and said swirl chamber being defined by said bottom portion and smaller diameter cylindrical portion of said nozzle body and said tip portion of said needle valve member when said needle valve member is at the opening positon of said needle valve member, such that the fuel is stably and efficiently injected in the form of a conical shape as extremely fine particles.

30. A swirl injection valve according to claim 29, wherein said inclined passage means further comprises a second straight groove which is formed in an outer wall of said smaller diameter portion of said needle valve member to extend 20 to 80 degrees less than said first groove in terms of said center angle about the center axis of said needle valve member, a downstream end of said second groove being positioned across said boundary, such that said second groove has a preset sectional area and has the same inclination angle of 30 to 60 degrees, the upstream ends of said first groove and said second groove being located at axially different positions on said needle valve member such that the upstream end of said first groove alone is opened into said pressure chamber at an initial stage of injection and the upstream ends of both of said first and second grooves are opened into said pressure chamber after a middle stage of injection, such that a small quantity of the fuel is injected at a larger spray angle at the initial stage and a desired quantity of the fuel is injected at a smaller spray angle after the middle stage of injection.

31. A swirl injection valve according to claim 29, wherein
said inclined passage means further comprises a second straight groove which is formed in an outer wall of said smaller diameter portion of said needle valve member, the downstream end of said second groove being positioned across said boundary, such that said second groove has a preset sectional area and has a smaller inclination angle than said first groove within said range of 30 to 60 degrees, the upstream ends of said first groove and said second groove being located at axially different positions on said needle valve member such that the upstream end of said groove alone is opened into said pressure chamber at an initial stage of injection and the upstream ends of both of said first and second grooves are opened into said pressure chamber after a middle stage of injection, such that a small quantity of the fuel is injected at a smaller spray angle at the initial stage and a desired quantity of the fuel is injected at a larger spray angle after the middle stage of injection.

32. A swirl injection valve according to claim 29, wherein
said needle valve member further comprises a different diameter portion formed between said tip portion of a conical shape and smaller diameter portion thereof, and
the downstream end of said groove is positioned across a stepped boundary between said smaller diameter portion and said different diameter portion of said needle valve member,
such that said tip portion of a conical shape to be seated on said valve seat is prevented from being damaged during a groove cutting operation.

33. A swirl injection valve comprising:
a nozzle body comprising a hollow cylindrical body having a bore and a bottom portion on which a nozzle port and a valve seat are formed;
a needle valve member, slidably inserted and reciprocally moved within said bore of said nozzle body, having a tip portion for seating on said valve seat and controlling the opening and closing of said nozzle port;
a swirl chamber formed at all times irrespective of the position of said needle valve member and disposed upstream of said nozzle port and defined between an inner wall of said nozzle body and an outer wall of said needle valve member;
a fuel supply passage formed within said nozzle body and connected to a fuel supply source;
inclined passage means provided in an outer wall of said needle valve member wherein said inclined passage means further comprises at least one short passage connected to said swirl chamber and fuel supply passage and tangentially opened to said swirl chamber at a predetermined inclined angle such that when said needle valve member is moved from its seated position in its opening direction, the fuel is tangentially supplied to said swirl chamber from said inclined passage means and a swirling flow of the fuel is formed within said swirl chamber, so that the swirling flow of the fuel is injected from said nozzle port;
a fuel spill passage means connected to said swirl chamber and to said fuel supply source, such that part of the fuel is spilled from said swirl chamber to said fuel supply source;
said bore of said nozzle body further comprises an upstream stepped portion;
said needle valve member further comprises an upper end connected to an electromagnetically actuated plunger, a stopper means for restricting sliding movement thereof within a predetermined distance, an upstream and a downstream guide portion hermetically fitted in the inner wall of said nozzle body, said downstream guide portion forming a partition member, and said tip portion of a conical shape;
the outer wall of said needle valve member and the inner wall of said nozzle body define an annular pressure chamber between an upper surface of said partition member and a lower surface of said upstream guide portion of said needle valve member, said annular pressure chamber being connected to said fuel supply passage,
said swirl chamber is formed between a lower surface of said partition member and the inner wall of said nozzle body, said swirl chamber and said pressure chamber being separated by said partition member,
said inclined passage means further comprises a straight groove formed in an outer wall of said partition member and connected to said annular pressure chamber, for introducing the fuel from said annular pressure chamber to said swirl chamber, said groove having a preset sectional area at the downstream end thereof and having an inclination angle within the range of 30 to 60 degrees with respect to a plane normal to the center axis of said needle valve member and, said groove being extended within the range of 60 to 100 degrees in terms of the center angle about the center axis of said needle valve member, and
said fuel spill passage means further comprises a spill passage formed within said needle valve member, such that the fuel is injected in the form of a conical shape at a preset spray angle into extremely fine particles immediately after a valve opening operation.

* * * * *